United States Patent Office 3,516,606
Patented June 23, 1970

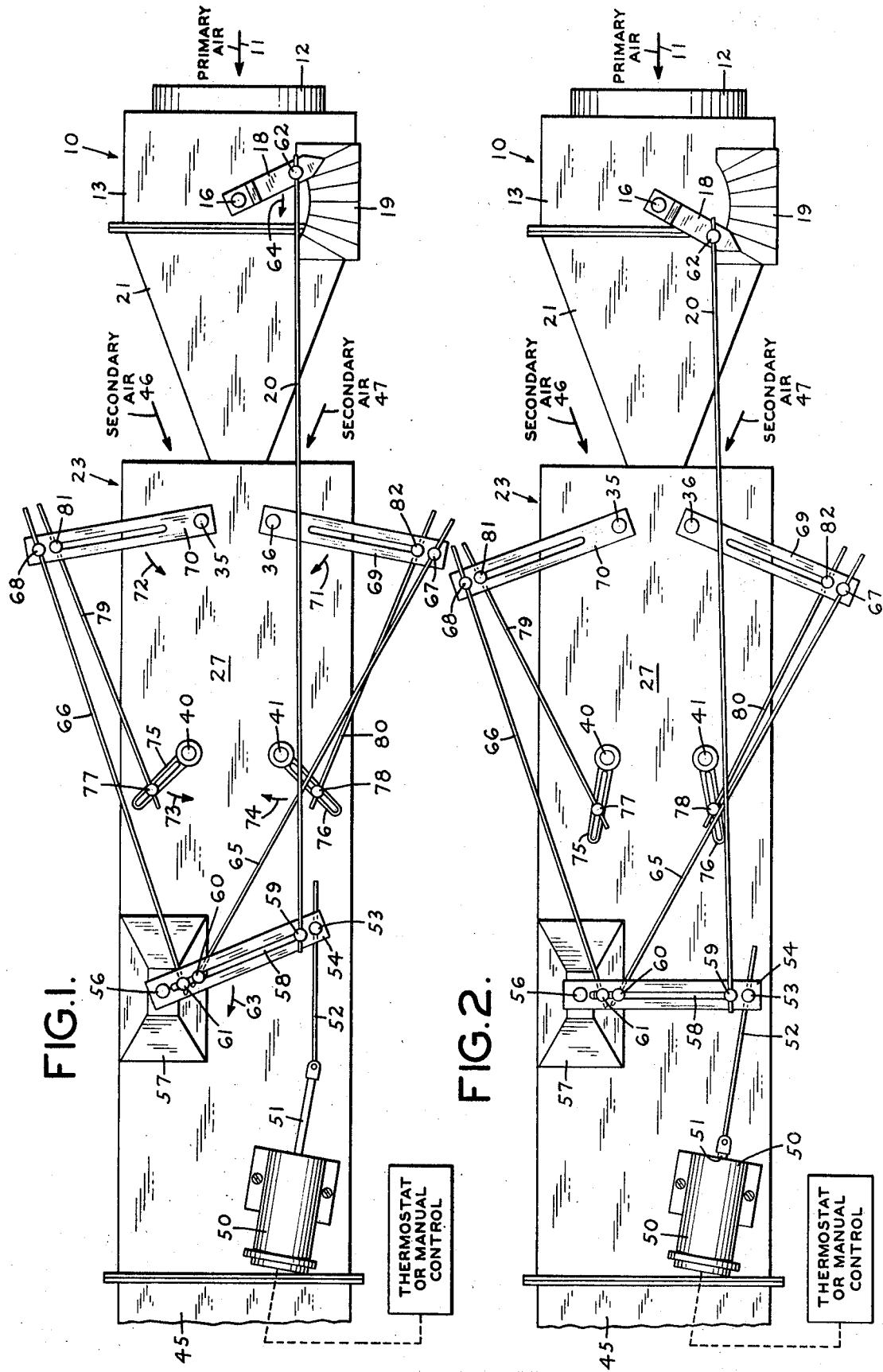

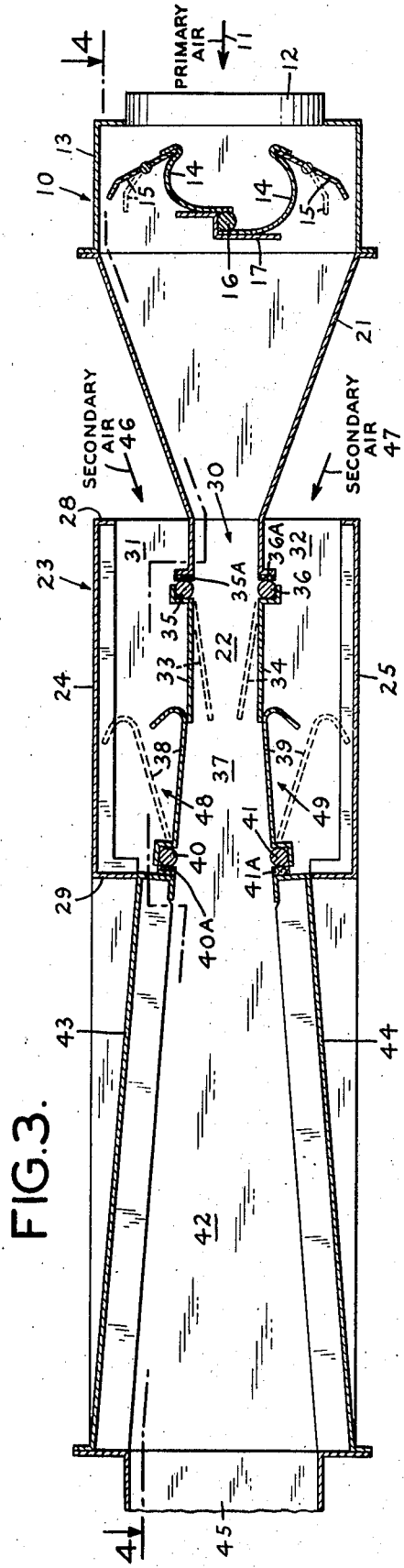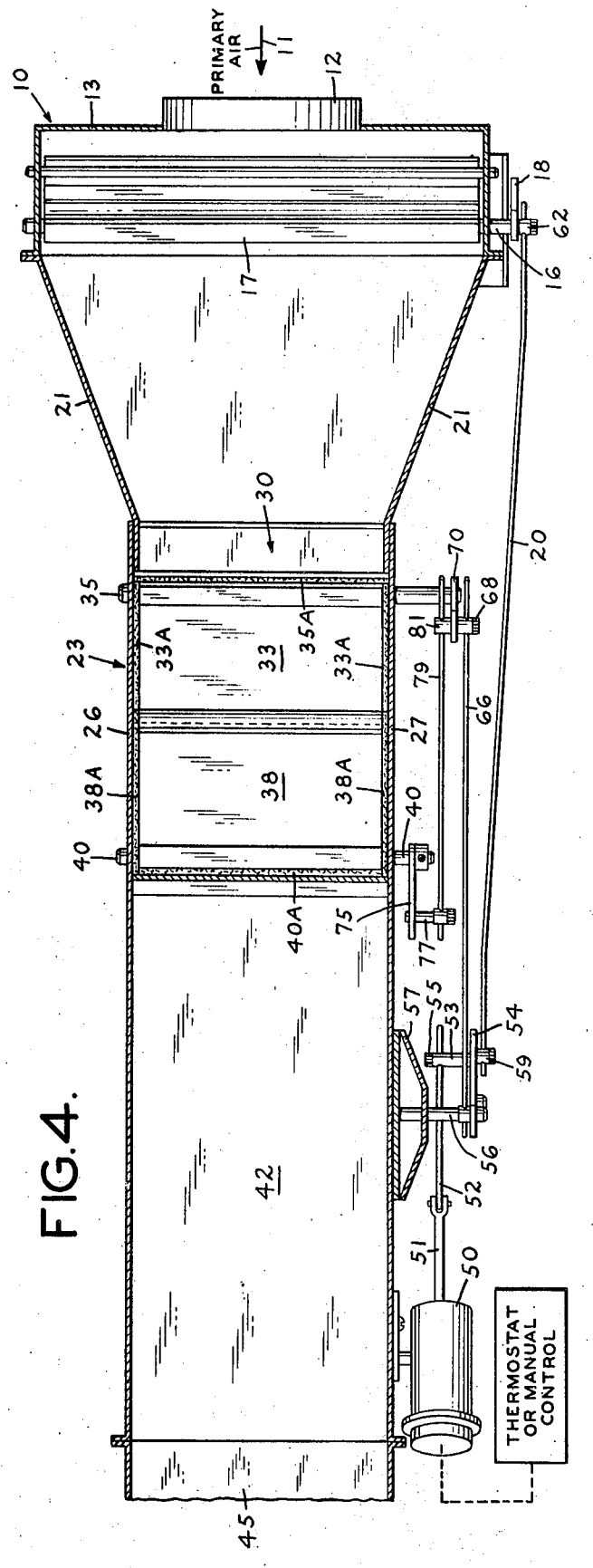

3,516,606
AIR-CONDITIONING TEMPERATURE VOLUME CONTROLLER
Albert S. Edwards, Agawam, Mass., assignor to Allied Thermal Corporation, New Britain, Conn., a corporation of Connecticut
Continuation of application Ser. No. 693,202, Dec. 26, 1967. This application Aug. 7, 1969, Ser. No. 854,014
Int. Cl. G05d 23/13
U.S. Cl. 236—13        16 Claims

ABSTRACT OF THE DISCLOSURE

A fluid controller for maintaining a substantially constant temperature and a substatnially constant volume of air delivered to a space to be supplied with conditioned air. Primary conditioned air is delivered to a mechanical volume controller which delivers a substantially constant, but adjustable, volume of air to an aspiration chamber where the flow of primary air aspirates or induces secondary air through an orifice into the chamber. The primary and secondary air is mixed and delivered to the space. A control device actuated by the temperature of the space adjusts simultaneously the volume of primary air delivered by the mechanical volume controller and the size of the orifice to change the ratio of primary and secondary air in a sense to oppose changes in temperature in the space without changing the total volume of air delivered to the space.

---

This case is a continuation of application Ser. No. 693,202, filed Dec. 26, 1967, now abandoned.

BACKGROUND OF THE INVENTION

The present invention is directed to air conditioning systems in which primary air, either cooled or heated, is mixed with secondary air before being supplied to the room or other space to be conditioned. The secondary air is usually drawn from the space being conditioned or from a plenum chamber communicating with that space. In such systems it is desirable that the volume of air delivered to the space be maintained substantially constant despite changes in primary air supply pressure and despite changes in the ratio of primary to secondary air necessitated by changes in the temperature of the conditioned space.

Various devices and systems have been used to effect mixing of primary and secondary air to control room temperature. The present invention is intended to provide a relatively simple but efficient and improved mechanism for this purpose and one which maintains the volume of air supplied to the conditioned space substantially constant.

SUMMARY OF THE INVENTION

In accordance with the invention there are provided a mechanical volume controller to which primary air is supplied and which delivers an adjustable, constant volume flow of air, an induction unit coupled to the mechanical volume controller to receive therefrom the primary air and having a set of pivoted vanes forming a primary air nozzle through which the primary air flows and a set of pivoted blades which cooperate with the vanes to form a secondary air inlet orifice through which secondary air is drawn by venturi action of the primary air flowing through the nozzle. A motor device actuated in accordance with conditioned space temperature is mechanically connected to the controller and to the sets of vanes and blades to alter simultaneously the volumes of primary air delivered by the controller and the size of the secondary air inlet orifice to change the ratio of primary to secondary air in a sense to maintain a constant temperature of the conditioned space and a constant total volume of primary and secondary air.

BRIEF DESCRIPTION OF THE DRAWINGS

The invention will now be described in greater detail with reference to the appended drawings in which:

FIG. 1 is a side elevational view of a fluid controller embodying the present invention and showing the control linkage in one position thereof;

FIG. 2 is a view similar to FIG. 1 showing the control linkage in another position thereof;

FIG. 3 is a longitudinal sectional view of the controller of FIG. 1; and

FIG. 4 is a cross sectional view taken along the line 4—4 of FIG. 3.

DESCRIPTION OF THE PREFERRED EMBODIMENT OF THE INVENTION

Referring now to the drawings, reference numeral 10 refers generally to a mechanical volume controller device which is constructed to provide, within its designed flow range, a substantially constant, but adjustable, flow of air. The construction of device 10 is indicated largely diagrammatically because it may be of any suitable type. Preferably the device 10 is constructed in accordance with the teachings of A. S. Edwards et al., U.S. Pat. 3,191,615, granted June 29, 1965. The device 10 and the other apparatus shown in the drawings usually will be located in the plenum space generally provided above the false ceiling of a room.

The device 10 receives primary conditioned air from a source indicated by the arrow 11 and which may be the usual air conditioning system primary air supply line. The air passes into the device 10 through an inlet opening 12 which communicates with a main housing 13.

As is best shown in FIG. 3, the housing 13 contains a double blanket motor 14 connected at opposite ends thereof to a pair of pivoted damper blades 15. A single blanket motor could, of course, be used. Such a motor is shown in the aforementioned Edwards patent. The blanket 14 passes around and through a split blanket rod 16 located adjacent a fixed blanket stop 17. The rod 16 is rotatably mounted in the side walls of housing 13. Rotation of rod 16 increases or decreases the length of the blanket between stop 17 and the respective damper blades 15.

Air passing through the housing 13 causes each half of the blanket 14 to assume a partially cylindrical shape because of the differential pressure acting thereon. The bowing of the blanket 14 tends to pivot the damper blades in a direction to reduce air flow through the housing. This action is opposed by spring forces acting on the damper blades and tending to urge them to open position. The spring mechanisms have not been shown in the drawings but the construction and principles of operation thereof are fully described in the aforementioned Edwards patent. The action of the blanket and springs on the dampers tends to maintain a constant volume of air flow irrespective of pressure changes in the primary air supply 11. Thus an increase in air pressure causes the blanket motor to bow more and pivot the damper blades towards more closed positions while a decrease in air pressure causes the blanket motor to bow less and pivot the damper blades towards more open positions, all as explained in the aforementioned Edwards patent.

The actual volume of air flow is adjustable by rotating the rod 16 to make more or less blanket available to the air stream and thus position the dampers in a more or less open position as indicated by the dashed and solid line positions of the blades 15 in FIG. 3.

Typically the primary air supplied to mechanical volume controller 10 will be in the range of 2 to 5" H₂O (intake static pressure, gage). The volume of air to be delivered by the controller 10 is adjusted by rotating rod 16.

The rod 16 has connected thereto a pointer 18 which cooperates with a scale 19 on the outside wall of housing 13 to indicate the rotational position of rod 16 and the corresponding volume of air flow. A control rod 20 is connected at one end thereof to pointer 18 to move the latter between the minimum primary volume position of FIG. 2 and the maximum primary volume position of FIG. 1 in a manner to be described below. As the pointer 18 is moved between these positions, the rod 16 is rotated correspondingly to alter the active lengths of the blanket motor sections which in turn control the basic positions of the damper blades.

Air leaving housing 13 passes through a converging inductor duct section 21 into a variable inductor nozzle section 22 located within an aspiration chamber 23 having top and bottom walls 24 and 25, side walls 26 and 27, an end wall 28 and intermediate wall 29. The end wall 28 encompasses a mouth portion 30 of duct section 21 but is spaced from duct section 21 at the top and bottom to leave secondary air inlet passages 31 and 32 which normally will communicate with the surrounding plenum chamber but which may be connected by ducts directly to some other source of secondary air, e.g., a troffer or other device communicating with the room being conditioned.

Inductor nozzle section 22 is defined at opposite sides thereof by side walls 26 and 27 of chamber 23 and at the top and bottom thereof by pivotable nozzle vanes 33 and 34 which are affixed to and pivot with shafts 35 and 36, respectively, which are journaled in side walls 26 and 27. The shafts 35 and 36 are rotatable between positions in which vanes 33 and 34 are in their solid line and dashed line positions as shown in FIG. 3.

Air leaving inductor nozzle section 22 enters a variable inductor throat blade section 37 located within the chamber 23 and defined at opposite sides thereof by side walls 26 and 27 and at the top and bottom thereof by inductor throat blades 38 and 39. Blades 38 and 39 are affixed to shafts 40 and 41, respectively, which are journaled for rotation in side walls 26 and 27. For convenience the elements 33 and 34 are called vanes and the elements 38 and 39 are called blades. However, it will be understood that they are essentially similar air deflecting elements. The shafts 40 and 41 are rotatable between positions in which blades 38 and 39 are in their solid line and dashed line positions in FIG. 3. The free ends of blades 38 and 39 are provided with outwardly extending hooked flanges which assist in providing a smooth air flow. To prevent air leakage around the shafts 35, 36, 40 and 41, felt seals (or seals of other suitable material) may be provided as shown at 35A, 36A, 40A and 41A. To prevent air leakage between the vanes and blades and the side walls 26 and 27, the vanes and blades may carry sealing pads of felt or similar material as indiacted at 33A and 38A in FIG. 4. The vanes 33 and 34 may also have sealing pads to contact blades 38 and 39, but these are not shown.

The exit end of variable inductor throat blade section 37 communicates with the entrance end of a diverging inductor duct section 42 and defined by side walls 26 and 27 and diverging top and bottom walls 43 and 44.

The exit end of section 42 communicates with rectangular duct 45 which forms a part of the usual tempered air distribution system leading to tempered air outlets such as troffers or other devices located in the walls or ceiling of the room or rooms intended to receive the tempered air. Commonly the return flow of air from such room or rooms leads to the plenum chamber and hence supplies the secondary air for passages 31 and 32. The plenum chamber is usually the space above a false ceiling.

The high velocity primary air jet passing through variable inductor nozzle vane section 22 and discharging into variable inductor throat blade section 37 creates a venturi action which induces secondary air from inlet passages 31 and 32 into variable inductor throat blade section 37 provided that the vanes and blades 33, 34, 38 and 39 are not in their solid line positions shown in FIG. 3. When these vanes and blades are in their solid line positions, no passage exists for secondary air to flow into section 37. However, when vanes and blades 33, 34, 38 and 39 are in any of their intermediate positions or in their dashed line positions, secondary air indicated by arrows 46 and 47 enters passages 31 and 32 and flows through passages 48 and 49 defined by the openings between vane 33 and blade 38 and between vane 34 and blade 39, respectively.

A control operator device 50 is mounted on side wall 27 of divergent duct section 42 of chamber 23. Control operator 50 has a control shaft 51 which moves in or out as the temperature of the room being conditioned changes. The control operator 50 may be an electrical, pneumatic or hydraulic motor device controlled by a thermostat or other automatic device or may be manually controlled. In the arrangement shown, the FIG. 2 position corresponds to the normal system condition with no control signal applied to device 50. The FIG. 1 position, which shows shaft 51 fully extended, corresponds to a maximum control signal applied to device 50.

As will be explained below, with no control signal applied to device 50 (FIG. 2) a minimum primary air will flow through chamber 23 and into delivery duct 45 while a maximum of secondary air will be aspirated into chamber 23 and through passages 48 and 49 to mix with the primary air delivered to duct 45. There will thus be a maximum tempering action. With a maximum control signal applied to device 50, which corresponds, with automatic control, to a high deviation in room air temperature from the pre-set value, no secondary air will enter chamber 23 and the flow of primary air will be increased to maintain the desired constant volume flow.

To effect the changes in primary and secondary air flow referred to, the shaft 51 of control operator device 50 is connected through operating linkages to the rod 16 of mechanical volume controller 10 and to shafts 35, 36, 40, and 41.

The first element of the operating linkage is a control connecting rod 52 which is coupled at one end thereof to the free end of shaft 51 through a pin and yoke, the yoke being provided at the end of shaft 51. The other end of rod 52 extends through a hole in a clamping element 53 carried on an elongated arm 54. A screw 55 acting in element 53 prevents relative motion of rod 52 and element 53. Element 53 is mounted on arm 54 so as to be rotatable between the positions thereof shown in FIGS. 1 and 2.

The arm 54 is pivotally mounted adjacent its top end on a stud 56 mounted on wall 27 by a bracket 57 which may be welded or otherwise affixed to the wall 27. The arm 54 is mounted to swing about stud 56 between the substantially vertical position shown in FIG. 2 and the inclined position shown in FIG. 1 as the control operator shaft moves from its fully retracted (no-control signal) position of FIG. 2 to its fully extended (maximum control signal) position of FIG. 1.

Arm 54 is provided with an elongated slot 58 in which are mounted three clamping elements 59, 60, and 61 similar to the element 53. The elements 59–61 are fixed in position in slot 58 but may rotate therein in the same manner as element 53. This connection may conveniently be achieved by affording enlarged portions of slot 58 to accommodate the clamping elements or by making the rod connecting portions of the clamping elements rotatable with respect to the balance thereof.

Element 59 is provided with a hole which accommodates one end of connecting rod 20. The other end of rod 20 is carried in a hole in a clamping element 62 rotatably carried on pointer 18. The rod 20 is rigidly affixed to clamping elements 59 and 62.

As the shaft 51 retracts from its FIG. 1 position toward its FIG. 2 position, arm 54 will swing in the direction shown by the arrow 63 in FIG. 1 because of the connection afforded by rod 52. And as the arm 54 swings, rod 20 likewise will cause pointer 18 to swing in the direction shown by arrow 64 in FIG. 1. As pointer 18 swings, rod 16 will rotate in a clockwise direction (FIG. 3) to shorten the blanket 14 and decrease the air volume flow setting of mechanical volume controller 10. The minimum volume setting of controller 10 is indicated by the full line positions of dampers 15 in FIG. 3, while the maximum volume setting is indicated by the dashed line positions of dampers 15. The dampers 15 will, of course, move from their set positions to maintain a constant volume of air flow with changes in supply pressure.

Clamping elements 60 and 61 are connected by connecting rods 65 and 66 respectively, to similar clamping elements 67 and 68 carried at respective ends of elongated arms 69 and 70. The other ends of arms 69 and 70 are affixed, respectively, to ends of shafts 36 and 35, respectively, projecting outwardly of wall 27. The arrangement is such that as arm 54 swings in the direction of arrow 63 (FIG. 1), connecting rods 65 and 66 will cause arm 69 to swing in the clockwise direction indicated by arrow 71 and arm 70 to swing in the counterclockwise direction of arrow 72. As the arms 69 and 70 swing, the shafts 36 and 35, respectively, will rotate in the same directions as the respective arms and will cause the vanes 34 and 33 to pivot toward each other (FIG. 3) from the solid line positions toward the dashed line positions. Hence the throat opening of variable inductor nozzle section 22 will be decreased.

The closing motion of mechanical volume controller dampers 15 and the closing motion of vanes 33 and 34 both correspond to a decrease in primary air volume delivered to the mixing chamber of variable inductor throat blade section 37. At the same time the blades 38 and 39 will pivot away from each other from their solid line positions (FIG. 3) toward their dashed line positions to thus open passages 48 and 49 to permit secondary air to be aspirated into the mixing chamber.

The pivoting action of blades 38 and 39 is caused by counterclockwise rotation of shaft 40 and clockwise rotation of shaft 41, as indicated by arrows 73 and 74, respectively (FIG. 1).

The rotation of shafts 40 and 41 is, in turn, produced by corresponding rotation of crank arms 75 and 76, respectively, which are affixed to the ends of shafts 40 and 41, respectively, projecting outside of wall 27.

The arms 75 and 76 are provided with elongated slots which accommodate connecting elements 77 and 78, respectively, which are similar to the connecting element 53. The connecting elements 77 and 78 each accommodate one end of respective connecting rods 79 and 80. The other ends of rods 79 and 80 are received in similar connecting elements 81 and 82, respectively, each received in an elongated slot provided in a respective one of arms 70 and 69. Hence as the arms 70 and 69 swing, arms 75 and 76 will likewise swing and cause the shafts 40 and 41 to rotate.

In the system condition in which there is no operating signal to control operator 50 the mechanical volume controller 10 is set at its minimum volume position (FIG. 2), the variable inductor nozzle vanes 33 and 34 are set at their minimum spacing (dashed line position in FIG. 3) and variable inductor throat blades 38 and 39 are set at their maximum spacing (dashed line position in FIG. 3). Thus a minimum primary air volume flows from the mechanical volume controller 10 through the converging inductor duct section 21 to variable inductor nozzle vane section 22. The high velocity primary air jet from the variable inductor nozzle vane section 22 induces with it secondary air from the secondary air inlet supply passages 46 and 47 and the passages 48 and 49. The secondary air is induced into the mixing chamber formed in variable inductor throat blade section 37. The tempered air (mixed primary and secondary air) flows through the diverging inductor duct section 42 into outlet delivery duct 45. The tempered air discharge volume is at a selected level which is the normal level of system operation. The tempered air discharge pressure will be relatively low, typically 0.5" $H_2O$ (discharge static pressure, gage) or less.

At a signal from an automatic device or thermostat controlled by room temperature or at a signal from a manually operated device, the control operator 50 extends the operating shaft 51 by an amount corresponding to the control signal and, through the control linkage described, adjusts the mechanical volume controller 10 to an increased primary volume setting, urges the variable inductor nozzle vanes 33 and 34 toward a more open position and urges the variable inductor throat blades 38 and 39 toward a more closed position. As a result, the primary air volume is increased and the secondary air volume is decreased by a substantially equal amount. The tempered air volume delivered to outlet duct 45 remains substantially constant. The tempered air temperature will, however, be higher or lower, depending on whether the primary air is heated or cooled.

The control operator 50 may, upon an additional signal, urge the dampers and blades to other positions and, ultimately, to the positions in which primary air volume is a maximum and secondary air volume is a minimum (zero or virtually zero). At this condition the mechanical volume controller 10 is set at a maximum air volume and the variable inductor nozzle vanes contact the variable inductor throat blades, thus closing off the secondary air passages 48 and 49. The air delivered to duct 45 will be all primary air but will be in substantially the same volume as the mixed air.

While the invention has been described in connection with a specific embodiment thereof and in a specific use, various modifications thereof will occur to those skilled in the art without departing from the spirit and scope of the invention as set forth in the appended claims.

What is claimed is:

1. A fluid controller for an air conditioning system intended to supply conditioned air from a source of primary conditioned air to a distribution system communicating with an enclosed space, said fluid controller comprising:
   (a) a mechanical volume controller coupled to said source of primary air and arranged to deliver an adjustable, substantially constant volume flow of primary air;
   (b) an induction unit coupled to the outlet of said mechanical volume controller to receive therefrom said primary air and having a set of pivoted vanes forming a primary air nozzle through which said primary air flows and a set of pivoted blades which cooperate with said vanes to form a secondary air inlet orifice through which secondary air is drawn by venturi action of said primary air flowing through said nozzle, said secondary air drawn through said orifice being mixed with said primary air exiting from said nozzle to form tempered air;
   (c) means to deliver said mixed primary and secondary air to said distribution system;
   (d) a motor device arranged to be actuated in accordance with a selected temperature of said enclosed space; and
   (e) means intercoupling said motor device, said mechanical volume controller and said sets of vanes and blades to alter simultaneously the volume of primary air delivered by said controller and the size of said secondary air inlet orifice to change the ratio of primary to secondary air in a sense to maintain a selected temperature of said enclosed space and a constant total volume of primary and secondary air delivered to said distribution system.

2. A fluid controller for an air conditioning system intended to supply conditioned air from a source of primary conditioned air to a distribution system communicating with an enclosed space, said fluid controller comprising:
(a) an automatic volume control device adapted to be connected to said source of primary conditioned air and being constructed to deliver a substantially constant volume flow of air despite changes of primary air pressure within an operating range, said control device having movable means arranged to assume a succession of positions in each of which said substantially constant volume flow of primary air has a different value;
(b) and an induction unit having an air inlet coupled to the outlet of said automatic volume control device to receive therefrom said substantially constant volume flow of primary air, and having an air outlet adapted to be connected to said distribution system for supplying conditioned air thereto, said induction unit comprising:
(1) means including a first set of pivotable dampers through which said primary air flows to induce by venturi action secondary air from outside said unit into said unit and into mixing relationship with said primary air to produce tempered conditioned air for delivery to said distribution system;
(2) means including a second set of pivotable dampers to vary the ratio of primary air to secondary air mixed in said unit for delivery to said distribution system; and
(3) means operatively interconnecting said first and second sets of dampers and said movable means whereby the volume of primary air flowing through said device and into said unit and the volume of secondary air aspirated into said unit by said venturi action is correlated automatically to vary the ratio of primary to secondary air mixed in said unit to maintain substantially constant the volume of tempered conditioned air delivered to said distribution system.

3. A fluid controller for an air conditioning system intended to supply conditioned air from a source of primary conditioned air to a distribution system communicating with an enclosed space, said fluid controller comprising:
(a) an automatic volume control device adapted to be connected to said source of primary conditioned air and being constructed to deliver a substantially constant volume flow of air despite changes of primary air pressure within an operating range, said control device having movable means arranged to assume a succession of positions in each of which said substantially constant volume flow of primary air has a different value;
(b) and an induction unit having an air inlet coupled to the outlet of said automatic volume control device to receive therefrom said substantially constant volume flow of primary air, and having an air outlet adapted to be connected to said distribution system for supplying conditioned air thereto, said induction unit comprising:
(1) a variable inductor nozzle vane section having a plurality of pivoted vanes forming a nozzle and arranged to receive primary air from said induction unit air inlet;
(2) first linkage means intercoupling said vanes for moving the same relative to each other in a sense to enlarge or diminish the nozzle opening;
(3) a variable inductor throat blade section having a plurality of pivoted blades forming therebetween a mixing chamber communicating with the outlet of said nozzle to receive primary air from said nozzle;
(4) second linkage means intercoupling said blades for moving the same relative to each other in a sense to enlarge or diminish the size of said mixing chamber;
(5) a secondary air inlet adapted to communicate with a source of secondary tempering air and including an air passage formed by said vanes and said blades, said vanes and said blades in one position thereof acting substantially to close said air passage and in all other positions thereof opening said air passage by an amount dependent on the relative positions of said vanes and blades; said primary air passing through said nozzle and discharging therefrom into said chamber causing secondary air to be aspirated through said air passage and into said mixing chamber except when said vanes and said blades are in said one position thereof; and
(6) third linkage means intercoupling said first and second linkage means and said movable means and being movable between:
a first position in which said movable means is set to produce a minimum value of said constant volume flow of primary air, said vanes assume a minimum spacing relative to each other to form a relatively small nozzle opening and said blades assume a maximum spacing relative to each other to form a relatively large mixing chamber and a relatively large air passage and
a second position in which said movable means is set to produce a maximum value of said constant volume flow of primary air, said vanes assume a maximum spacing relative to each other to form a relatively large nozzle opening and said blades assume a minimum spacing relative to each other to form a relatively small mixing chamber.

4. A fluid controller as set forth in claim 3 comprising a motor device responsive to a control signal and connected to said third linkage means to move the latter between said first and second positions thereof in response to said control signal.

5. A fluid controller as set forth in claim 4 in which said control signal is applied to said motor device in response to changes in the temperature of the space being conditioned and in a sense to oppose said changes.

6. A fluid controller as set forth in claim 3 in which said vanes and said blades contact each other in said one position thereof to close said air passage, said vanes and blades being arranged to assume said one position thereof when said third linkage means is in said second position thereof.

7. A fluid controller as set forth in claim 3 in which said third linkage means can be placed in any one of an infinite number of positions between said first and second positions thereof.

8. A fluid controller for an air conditioning system intended to supply conditioned air from a source of primary conditioned air to a distribution system communicating with an enclosed space, said fluid controller comprising:
(a) a mechanical automatic volume control device adapted to be connected to said source of primary conditioned air and being constructed to deliver a substantially constant volume flow of air despite changes of primary air pressure within an operating range, said control device having an externally controllable movable means movable through a succession of positions between a first position in which said substantially constant volume flow of primary air has a minimum value and a second position in which said substantially constant volume flow of primary air has a maximum value;

(b) a converging duct section having an inlet connected to the outlet of said mechanical volume control device and having an outlet, the cross sectional area of said converging duct section decreasing between said inlet and outlet thereof to increase the velocity of primary air flowing therethrough;

(c) an induction unit having an inlet coupled to the outlet of said converging duct section to receive therefrom said substantially constant volume flow of primary air and having an air outlet, said induction unit comprising:

(1) a top wall, a bottom wall and a pair of side walls, said walls having an opening communicating with the outside of said induction unit for admitting secondary air into said unit;

(2) a pair of rotatable vane control shafts and a pair of vanes disposed in facing relationship and each being mounted for pivoting motion on a respective one of said rotatable vane control shafts adjacent a corresponding edge of each vane for pivoting motion toward and away from each other, said vanes and said side walls defining a nozzle and being arranged to receive the primary air from said converging duct section and to discharge said primary air in an axial path; and (3) a pair of rotatable blade control shafts and a pair of blades disposed in facing relationship and each being mounted for pivoting motion on a respective one of said rotatable blade control shafts adjacent a corresponding edge of each blade for pivoting motion toward and away from each other, said blades being disposed on opposite sides of said path downstream of said vanes and forming, with said side walls, an inductor throat section for receiving primary air discharged from said nozzle, each of said blades being arranged relative to a respective one of said vanes to define therebetween a secondary air inlet passage to said throat to admit secondary air from said opening in said walls into said throat, said primary air passing through said nozzle and discharging therefrom into said throat causing secondary air to be aspirated through said opening and through said inlet passages into said throat and to mix in said throat with the primary air therein to produce a mix tempered air;

(d) a diverging duct section having an inlet communicating with said throat to receive tempered air therefrom and having an outlet of larger cross section than said inlet thereof and communicating with said distribution system to deliver to the latter tempered air at a relatively low velocity;

(e) motor means having a movable element movable between a succession of positions each representative of a temperature condition in said enclosed space; and (f) linkage means intercoupling said movable element with said movable means, said rotatable vane control shatfs and said rotatable blade control shafts so that motion of said movable element between a first position thereof and a second position thereof produces coordinated motion of said movable means and said shafts, said linkage means being arranged so that in all operative positions thereof substantially the same volume of tempered air flows into said distribution system from said diverging duct section and so that:

(1) in said first position of said movable element said movable means is in said first position thereof, said vanes are pivoted to a minimum spacing therebetween and said blades are pivoted to a maximum spacing therebetween to thereby minimize the flow of primary air into said throat and to maximize the flow of secondary air into said throat;

(2) in said second position of said movable element said movable means is in said second position thereof, said vanes are pivoted to a maximum spacing therebetween and said blades are pivoted to a minimum spacing therebetween to thereby maximize the flow of primary air into said throat and to minimize the flow of secondary air into said throat; and (3) in all intermediate positions of said movable element said movable means and said rotatable shafts are positioned in intermediate positions in which the ratio of primary to secondary air has a unique value but the total volume flow of tempered air remains substantially constant.

9. A fluid controller as set forth in claim 8 in which each of said blades contacts a respective one of said vanes when said movable element is in said second position thereof thereby to close said secondary air inlet passages.

10. A fluid controller as set forth in claim 8 in which the primary air flow through said nozzle and said throat lies along an axis and in which said rotatable shafts extend across said axis, said rotatable vane control shafts being located adjacent the outlet of said converging duct section and said rotatable blade control shafts being located adjacent the inlet of said diverging duct section.

11. A fluid controller as set forth in claim 8 in which said linkage means comprises:

(a) a first arm pivotally connected to one of said walls adjacent one end thereof and connected to said movable element adjacent the other end thereof to swing through an arc as said movable element moves between said first and second positions thereof;

(b) individual arms each connected to a respective one of said shafts and said movable means for rotating said shafts and moving said movable means; and (c) a plurality of connecting rods interconnecting said first arm with said individual arms for pivoting the latter through a succession of locations each corresponding to a particular position of said movable element including and between said first and second positions thereof.

12. A fluid controller as set forth in claim 8 in which said automatic volume control device includes a rotatable shaft element forming a part of said movable means, pivotable vane means arranged in the path of primary air flow through said volume control device and blanket means connected to said vane means to pivot the latter and disposed in said path of primary air flow through said device being connected to said rotatable shaft element to change the length of said blanket means upon rotation of said shaft element.

13. A fluid controller for an air conditioning system intended to supply conditioned air from a source of primary conditioned air to a distribution system communicating with an enclosed space, said fluid controller comprising:

(a) a mechanical volume controller coupled to said source of primary air and arranged to deliver an adjustable, substantially constant volume flow of primary air;

(b) an induction unit coupled to the outlet of said mechanical volume controller to receive therefrom primary air and being coupled to a source of secondary air, said unit having structure forming primary and secondary air passages, said primary air passage including a nozzle through which primary air flows, said secondary air passage being cooperatively located relative to said nozzle so that secondary air is drawn from said source of secondary air through said secondary air passage by venturi action of said primary air flowing through said nozzle, said secondary air drawn through said secondary air passage being mixed with said primary air exiting from said nozzle to form tempered air, said unit including vane means forming a part of at least one of said passages and being movable to vary the relative sizes of said passages;

(c) means to deliver said mixed primary and secondary air to said distribution system;

(d) a motor device arranged to be actuated in accordance with a selected temperature of said enclosed space; and (e) means intercoupling said motor device, said mechanical volume controller and said vane means to alter simultaneously the volume of primary air delivered by said controller and the relative sizes of said nozzle and said secondary air inlet passage to change the ratio of primary to secondary air in a sense to maintain a selected temperature of said enclosed space and a substantially constant total volume of primary and secondary air delivered to said distribution system.

14. A fluid controller as set forth in claim 13 in which said vane means forms a part of said nozzle.

15. A fluid controller as set forth in claim 13 in which said vane means forms a part of said secondary air passage.

16. A fluid controller as set forth in claim 13 in which said vane means comprises first movable blade means forming a part of said nozzle and second movable blade means forming a part of said secondary air passage.

References Cited

UNITED STATES PATENTS

| | | | |
|---|---|---|---|
| 3,361,157 | 1/1968 | Schach | 137—489 |
| 3,390,720 | 7/1968 | Meckler | 98—38 |

WILLIAM E. WAYNER, Primary Examiner

U.S. Cl. X.R.

98—38; 137—604